United States Patent
Yao et al.

(10) Patent No.: US 11,381,123 B2
(45) Date of Patent: Jul. 5, 2022

(54) HYBRID STATOR CORE COMPONENT DESIGN FOR AXIAL FLUX MOTOR

(71) Applicant: GM GLOBAL TECHNOLOGY OPERATIONS LLC, Detroit, MI (US)

(72) Inventors: Jian Yao, Shanghai (CN); Mingyuan Zhang, Shanghai (CN); Chengwu Duan, Shanghai (CN); Yusheng Zou, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 106 days.

(21) Appl. No.: 16/785,106

(22) Filed: Feb. 7, 2020

(65) Prior Publication Data

US 2021/0152040 A1    May 20, 2021

(30) Foreign Application Priority Data

Nov. 15, 2019 (CN) .......................... 201911120257.X (51) Int. Cl.
*H02K 1/27* (2022.01)
*H02K 1/02* (2006.01)
(Continued)

(52) U.S. Cl.
CPC ............. *H02K 1/2713* (2013.01); *H02K 1/02* (2013.01); *H02K 1/14* (2013.01); *H02K 3/521* (2013.01); *H02K 7/003* (2013.01)

(58) Field of Classification Search
CPC .......... H02K 1/2713; H02K 1/02; H02K 1/14; H02K 3/521; H02K 7/003; H02K 2213/03;
(Continued)

(56) References Cited

U.S. PATENT DOCUMENTS

| 4,463,303 A | 7/1984 | Kirschbaum |
| 6,894,413 B2 | 5/2005 | Nakano et al. |

(Continued)

FOREIGN PATENT DOCUMENTS

| CN | 207743770 U | * 8/2018 |
| CN | 112803691 A | 5/2021 |

(Continued)

OTHER PUBLICATIONS

Yao, Jian et al., U.S. Appl. No. 16/426,797, filed May 30, 2019 entitled, "Centrifugal Fluid-Cooled Axial Flux Motor," 32 pages.
(Continued)

*Primary Examiner* — Thomas Truong
(74) *Attorney, Agent, or Firm* — Harness, Dickey & Pierce, P.L.C.

(57) ABSTRACT

The present disclosure provides hybrid stator core components for an axial flux motor stator and methods for making the same. The hybrid stator core component includes a molded soft magnetic composite material and a laminated component. In one variation, a laminated insert comprising a plurality of insulated layers is non-releasably seated within a molded soft magnetic composite material. In another variation, a hybrid stator core component has a molded soft magnetic core and a laminated shell comprising a plurality of layers disposed around at least a portion of the molded soft magnetic core.

20 Claims, 3 Drawing Sheets

(51) Int. Cl.
  *H02K 3/52* (2006.01)
  *H02K 1/2713* (2022.01)
  *H02K 1/14* (2006.01)
  *H02K 7/00* (2006.01)

(58) Field of Classification Search
  CPC ........ H02K 1/148; H02K 21/24; H02K 1/182; H02K 2201/09
  See application file for complete search history.

(56) References Cited

U.S. PATENT DOCUMENTS

| | | | |
|---|---|---|---|
| 7,692,357 | B2 | 4/2010 | Qu et al. |
| 8,466,592 | B2 | 6/2013 | Atallah et al. |
| 9,742,225 | B2 | 8/2017 | Klassen et al. |
| 9,755,463 | B2 | 9/2017 | Klassen et al. |
| 9,882,518 | B2 | 1/2018 | McLean |
| 9,917,484 | B2 | 3/2018 | Aoyama |
| 9,963,185 | B2 | 5/2018 | Neugebauer et al. |
| 10,291,086 | B2 | 5/2019 | Deak et al. |
| 2009/0230806 | A1 | 9/2009 | Miyata et al. |
| 2012/0001512 | A1 | 1/2012 | Dajaku |
| 2012/0126652 | A1 | 5/2012 | Shah et al. |
| 2014/0285048 | A1 | 9/2014 | Seo et al. |
| 2017/0047821 | A1 | 2/2017 | Klassen |
| 2017/0155291 | A1* | 6/2017 | DE K ................ H02K 1/182 |
| 2018/0323663 | A1* | 11/2018 | Ogawa ............... H02K 1/2793 |
| 2019/0020239 | A1 | 1/2019 | Tsujimori et al. |
| 2019/0165632 | A1 | 5/2019 | Mabuchi et al. |
| 2019/0273406 | A1 | 9/2019 | Gehlert et al. |
| 2019/0283972 | A1 | 9/2019 | Yasinski |
| 2019/0288571 | A1 | 9/2019 | Lehikoinen et al. |
| 2019/0288584 | A1 | 9/2019 | Vansompel et al. |
| 2019/0363598 | A1 | 11/2019 | Coppola et al. |
| 2020/0251946 | A1 | 8/2020 | Yao et al. |
| 2020/0274410 | A1 | 8/2020 | Yao et al. |
| 2021/0143700 | A1 | 5/2021 | Yao et al. |
| 2021/0152041 | A1 | 5/2021 | Duan et al. |

FOREIGN PATENT DOCUMENTS

| | | |
|---|---|---|
| CN | 112821702 A | 5/2021 |
| DE | 102020127228 A1 | 5/2021 |
| DE | 102020127447 A1 | 5/2021 |
| EP | 3012944 A1 | 4/2016 |
| EP | 1416254 B1 | 2/2017 |
| WO | 2016084219 A1 | 6/2016 |

OTHER PUBLICATIONS

Yao, Jian et al., U.S. Appl. No. 16/426,807, filed May 30, 2019 entitled, "Axial Flux Motor Having an Insulated Rotor," 27 pages.

Clemens, Kevin, "A New Generation of Axial Flux EV Motors," Electric & Hybrid Vehicle Technology Expo—Novi, Michigan, May 21, 2018 [retrieved on Dec. 11, 2019]. Retrieved from the Internet: <URL: https://www.designnews.com/content/new-generation-axial-flux-ev-motors/186519862158706>, 4 pages.

Hannon, Bert et al., "Time- and Spatial-Harmonic Content in Electrical Machines and its Applicationin Fourier-Based Models," 2016 XXII International Conference on Electrical Machines (ICEM), Sep. 4-7, 2016; DOI: 10.1109/ICELMACH.2016.7732586.

Moreels, Daan, "Axial Flux vs Radial Flux: 4 Reasons why Axial Flux Machines have a Higher Power Density," Magnax, Jan. 31, 2018 [retrieved on Dec. 11, 2019]. Retrieved from the Internet: <URL: https://www.magnax.com/magnax-blog/axial-flux-vs-radial-flux.-4-reasons-why-does-axial-flux-machines-deliver-a-higher-power-density>, 12 pages.

Moreels, Daan, "Axial-Flux Motors and Generators Shrink Size, Weight," Power Electronics , Jul. 13, 2018, [retrieved on Dec. 11, 2019]. Retrieved from the Internet: <URL: https://www.powerelectronics.com/automotive/axial-flux-motors-and-generators-shrink-size-weight>, 13 pages.

Park, Jae-Do et al., "Analysis and Reduction of Time Harmonic Rotor Loss in Solid-Rotor Synchronous Reluctance Drive," IEEE Transaction on Power Electronics, vol. 23, No. 2 (Mar. 2008); DOI: 10.1109/TPEL.2007.91522.

* cited by examiner

HYBRID STATOR CORE COMPONENT DESIGN FOR AXIAL FLUX MOTOR

CROSS-REFERENCE TO RELATED APPLICATIONS

This application claims the benefit and priority of Chinese Patent Application No. 201911120257.X, filed Nov. 15, 2019. The entire disclosure of the above application is incorporated herein by reference.

INTRODUCTION

This section provides background information related to the present disclosure which is not necessarily prior art.

The present disclosure relates generally to hybrid stator core components for stators in axial flux motors, and more specifically, hybrid stator core components have a molded soft magnetic core component and a laminated component comprising a plurality of insulated layers of magnetic material.

Electric motors convert electrical energy into mechanical work by the production of torque, while electric generators convert mechanical work to electrical energy. Electric vehicles, including hybrid vehicles, employ electric motors/generators, such as induction motors and permanent magnet motors, to propel the vehicles, as well as to capture braking energy when acting as an electric generator. Motors will be referred to herein; however, it will be understood that such principles also equally apply to generators. Generally, the electric motor includes a rotor that rotates during operation and a stator that is stationary. The rotor may contain a plurality of permanent magnets and rotates relative to the fixed stator. The rotor is connected to a rotor shaft that also rotates with the rotor. The rotor, including the permanent magnets, is separated from the stator by a predetermined air gap. The stator includes conductors in the form of wire windings. When electrical energy is applied through the conductive wire windings, a magnetic field is generated. When electric energy is fed into the conductive windings of the stator, the power can be transferred over the air gap by a magnetic flux creating torque that acts on the permanent magnets in the rotor. In this manner, mechanical power can be transferred to the rotating rotor shaft. In an electric vehicle, the rotor thus transmits torque via the rotating shaft through a gear set to the drive wheels of the vehicle.

Two common types of electric motors include radial flux and axial flux type motors. In a radial flux motor, the rotor and stator are typically situated in a concentric or nested configuration, so that when a stator is energized, it creates a magnetic flux that extends radially from the stator to the rotor. Thus, the conductive windings in the stator are typically arranged parallel to an axis of rotation so that a magnetic field is generated that is oriented in the radial direction from the axis of rotation (along the rotor shaft). In an axial flux motor, a magnetic field parallel to an axis of rotation is produced by the electrically conductive wire windings in the stator, so the magnetic flux extends parallel to an axis of rotation (parallel to the rotor shaft). In certain applications, axial flux motors are desirable because they are relatively lightweight, generate increased power, and have a compact size as compared to radial flux motors.

SUMMARY

This section provides a general summary of the disclosure, and is not a comprehensive disclosure of its full scope or all of its features.

The present disclosure relates to a hybrid stator core component for an axial flux motor stator including a laminated insert that has a plurality of insulated layers including a ferromagnetic material. Further, a molded soft magnetic composite material is disposed around a portion of a perimeter of the laminated insert. The laminated insert is non-releasably seated within the molded soft magnetic composite.

In one aspect, the molded soft magnetic composite defines an external surface including at least one recessed region configured to receive conductive wire windings.

In one aspect, each layer of the plurality of layers has substantially the same dimensions.

In one aspect, the laminated insert has a rectangular cross-sectional shape.

In one aspect, the laminated insert defines a first region of a first exterior surface of the hybrid stator core component and a second region of a second exterior surface of the hybrid stator core component.

In one aspect, the hybrid stator core component further includes a plurality of laminated inserts that define an insert assembly. The molded soft magnetic composite material is disposed around a portion of each of the plurality of laminated inserts in the insert assembly.

In one further aspect, the insert assembly includes at least three laminated inserts.

In one further aspect, the insert assembly includes at least five laminated inserts.

In one aspect, the molded soft magnetic composite material defines an external cross-sectional shape that is substantially trapezoidal.

In one aspect, the ferromagnetic material includes steel. The soft magnetic composite material includes a plurality of magnetic particles including iron.

In one aspect, an axial flux motor includes a stator including a plurality of hybrid stator core components like those described above, where each hybrid stator core component has conductive wire disposed around an exterior thereof. The axial flux motor also includes a rotor facing the stator and including a plurality of magnets, wherein the stator and the rotor define an air gap therebetween. A rotor shaft is coupled to the rotor and defines a rotational axis. The plurality of insulated layers each defines a major plane that are parallel to one another.

The present disclosure also relates to a hybrid stator core component for an axial flux motor stator that includes a molded soft magnetic composite core and a laminated shell. The laminated shell includes a plurality of layers including a ferromagnetic material disposed around at least a portion of the molded soft magnetic composite core.

In one aspect, an insulating material is disposed adjacent to at least one of the plurality of layers.

In one aspect, the laminated shell defines an external surface including at least one recessed region configured to receive conductive wire windings.

In one aspect, the ferromagnetic material includes a steel and the soft magnetic composite material includes a plurality of magnetic particles including iron.

In one aspect, an axial flux motor includes a stator including a plurality of hybrid stator core components like those described above, where each hybrid stator core component has conductive wire disposed around an exterior thereof. The axial flux motor also includes a rotor facing the stator and including a plurality of magnets, wherein the stator and the rotor define an air gap therebetween. A rotor shaft is coupled to the rotor and defines a rotational axis.

The present disclosure further relates to a method of making a hybrid stator core component for an axial flux motor stator. The method includes disposing a laminated insert including a plurality of insulated layers including a ferromagnetic material in a mold having a predetermined shape corresponding to the hybrid stator core component. A precursor of a soft magnetic composite material including a plurality of magnetic particles each having an insulating coating is introduced into a mold. Pressure is applied to mold a soft magnetic composite material around a portion of a perimeter of the laminated insert, where the laminated insert is non-releasably seated within the molded soft magnetic composite.

In one aspect, the laminated insert is a plurality of laminated inserts that form an insert assembly.

In one aspect, the method further includes forming the laminated insert prior to the disposing into the mold, by punching each layer from a sheet of ferromagnetic material and stacking the layers together.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers, and/or sections, these steps, elements, components, regions, layers, and/or sections should not be limited by these terms, unless otherwise indicated. These terms may be only used to distinguish one step, element, component, region, layer, or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Figure 1:
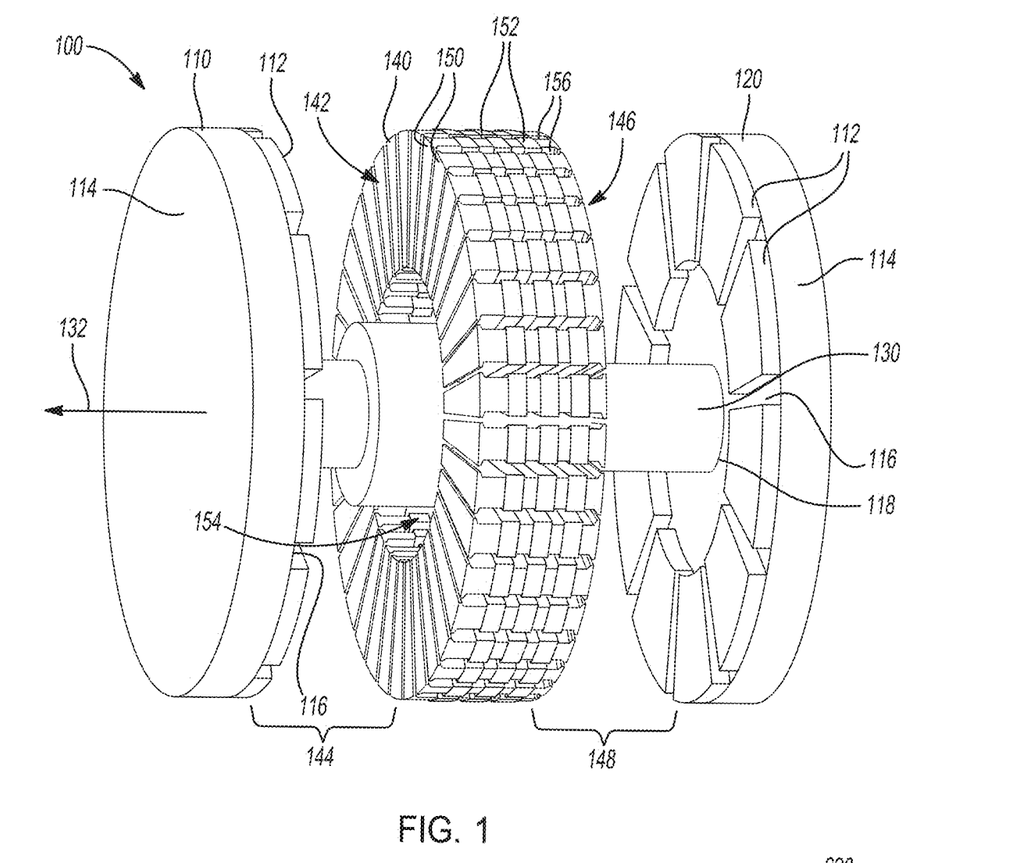
FIG. 1 shows a representative axial flux motor having one stator and two rotors.

In various aspects, the present disclosure pertains to hybrid stator core components for axial flux motors. It will be appreciated that the concepts apply not only to electric axial flux motors that generate mechanical energy from electrical energy, but also to axial flux generators that can generate electrical energy from mechanical energy. A non-limiting example of an electric device in the form of an axial flux motor 100, also known as a pancake motor, is shown in FIG. 1. The motor 100 has a first rotor 110 and a second rotor 120 both connected to and configured to rotate about a rotor shaft 130. Both the first and second rotors 110, 120 have an annular or disk shape with a centrally disposed aperture 118. The rotor shaft 130 passes through the centrally disposed aperture 118. The rotor shaft defines a rotational axis 132 about which the rotor turns.

A stator 140 is disposed between the first rotor 110 and the second rotor 120. The stator 140 may have an annular or disk shape. The stator 140 is fixed and stationary, while the first and second rotors 110, 120 rotate during operation with the rotor shaft 130. The first rotor 110 faces a first side 142 of the stator 140 and defines a first air gap 144 therebetween. The second rotor 120 faces a second side 146 of the stator 140 and defines a second air gap 148 therebetween.

Though motor 100 is shown to have a central single stator 140 and two external rotors 110, 120, as appreciated by those of skill in the art, other configurations are also contemplated. These other variations may include those having two stators and a single rotor, or where the electric motor assembly includes more or fewer rotors and/or stators. The ensuing description also applies to these other embodiments. Further, though not currently shown, the skilled artisan will appreciate that in various aspects, electric motor assemblies may further include a housing and the rotors and stators and shaft may be disposed within the housing. The housing may, in certain aspects, be fixed to a vehicle frame and the shaft may be coupled to a gearbox, for example a reduction gearbox, within the vehicle.

Each of the first rotor 110 and the second rotor 120 can have the same design (facing in opposite directions towards the stator 140) and thus the common components will be described herein. Each of the first rotor 110 and second rotor 120 includes a plurality of permanent magnets 112 affixed to a rotor body 114. The permanent magnets 112 may have alternating polarity. Each permanent magnet 112 defines a channel 116 therebetween, which may extend radially along a face of the respective rotor. In this manner, the permanent magnets 112 and the channel 116 can together define a plurality of magnetic poles.

The stator 140 includes a plurality of stator segments or core components 150 about which a plurality of electrically conductive windings 152 are wrapped. The stator 140 defines a plurality of slots 156 between respective stator core components 150, where the conductive windings 152 may extend over or bridge the slots 156. The stator 140 may be fixed and stationary. Although not illustrated, other winding configurations and technologies as understood in the art are also contemplated. For example, in certain aspects, the slots 156 may be configured to receive plurality of electrically conductive windings 152, which are wound in and through the slots 156. The conductive wire or windings 152 may comprise copper or copper alloys.

Rotor shaft 130 may pass through a centrally disposed aperture 154 in the stator 140 and be supported by bearings that align the rotors 110, 120 with respect to the stator 140 while allowing rotation of the rotor shaft 130. The plurality of electrically conductive windings 152 of the stator 140 may be formed of copper or other conductive wires configured to generate a magnetic field when current is applied so as to interact with magnetic fields of the plurality permanent magnets 112 having alternating poles located on the first and second rotors 110, 120. Different regions of the stator 140 may be selectively energized to impart a rotational force on the first and second rotors 110, 120 causing the rotors 110, 120 and the rotor shaft 130 to rotate with respect to the rotational axis 132. The axial flux motor 100 having a single stator 140 and first and second rotors 110, 120 is capable of use in high torque applications, including for use in an electric or hybrid vehicle. In such a variation, a housing encasing the motor 100 may be attached to the vehicle frame and at least one output from an end of the rotor shaft 130 is coupled to a reduction gearbox or directly to the vehicle drive wheels. The vehicle application of the axial flux motor 100 is provided as an exemplary embodiment and is not intended to be limiting.

Figures 2, 3:
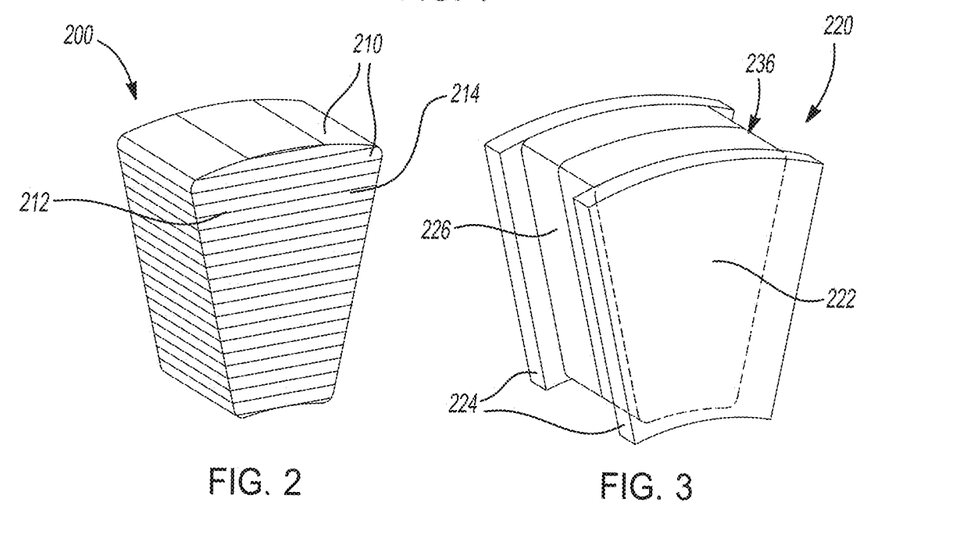
FIG. 2 shows a laminated stator core component including a plurality of laminated layers.
FIG. 3 shows a molded soft magnetic composite stator core component.
Figure 4:
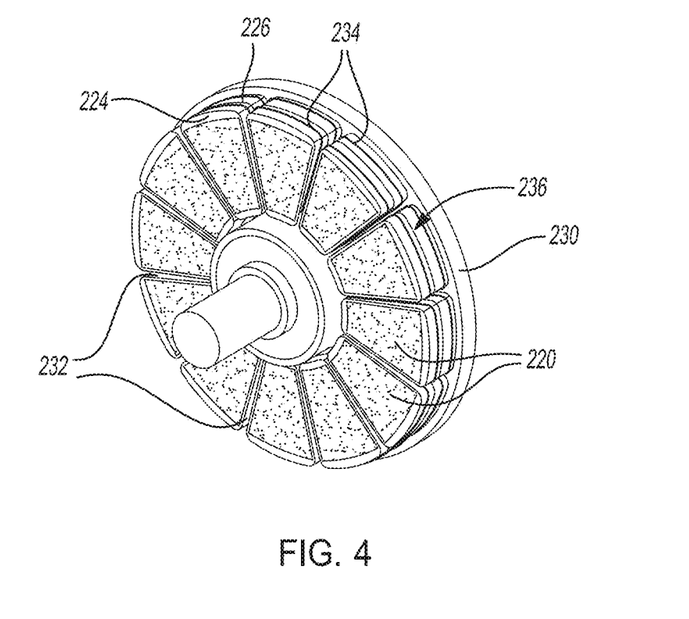
FIG. 4 shows a stator having a plurality of stator core components like that described in FIG. 3.

FIGS. 2-4 show stator core components that can be used in a stator of an axial flux motor, like stator 140 in FIG. 1. Conductive wires are disposed or wrapped around an exterior of the stator. FIG. 2 shows a laminated stator core component 200 having a plurality of layers 210 of magnetic material, such as a ferromagnetic material like magnetic steel. Other magnetic materials may include ferrimagnetic materials. Such magnetic material layers are typically isolated from one another by an insulating material interleaved therebetween. The laminated steel sheets may be punched, optionally annealed, and stacked in manufacturing process to form a laminated stator core component. When multiple laminated stator core components are assembled together, they form a plurality of magnetizable poles. As can be seen, the stator core component may be an assembly of a multiple distinct laminated layer structures or modules, which may have distinct orientations with respect to one another. In other aspects, the multiple laminated modules may have substantially the same orientation with respect to one another. While not shown in FIG. 2, each pole defined by the stator core component 200 will have an electrically conductive wire at least partially disposed or wrapped around it. Such a laminated stator core component 200 has the advantage of reducing eddy currents and minimizing hysteresis when incorporated into a stator of an axial flux motor. However, stator core components often have complex shapes. For example, as can be seen in FIG. 2, a first layer 212 has a first size defined by its length, width, and height (e.g., thickness), while a second layer 214 in the stack has a second size defined by its length, length, and height (e.g., thickness). The second size of the second layer 214 is necessarily smaller than the first size of the first layer 212 due to the substantially trapezoidal shape of stator core component 200. Therefore, manufacturing of multiple laminated stator core materials, where each layer has a different dimension and potentially different shape, can make the manufacturing process significantly more complicated and may create significant waste.

Another option for forming the stator core components is shown in FIGS. 3-4, where a stator core component 220 is formed from a soft magnetic composite (SMC) material 222. SMC powders comprise a soft magnetic material, the surface of which may be covered with an electrically insulating layer. These powders are consolidated to form soft-magnetic components by means of pressing or consolidation. Thus, such an SMC material 222 can be readily formed into a variety of different and complex shapes, like the substantially trapezoidal cross-sectional shape shown. The stator core component 220 optionally has one or more flanges 224 that define recessed regions 226. FIG. 4 shows a plurality of stator core components 220 circumferentially assembled on a stator disc 230. A plurality of channels 232 is defined between each stator core component 220. As shown in FIG. 4, the recessed regions 226 are configured to receive at least one electrically conductive wire or winding 234 disposed therein (e.g., by being wrapped about at least a portion of an exterior 236 of the stator core component 220). While the stator core component 220 formed of an SMC material 222 can be readily manufactured into a variety of complex shapes, the stator core component 220 can potentially generate undesirable eddy currents and may have increased hysteresis when incorporated into a stator of an axial flux motor.

In various aspects, the present disclosure provides a hybrid stator core component for an axial flux motor stator. In one variation shown in FIG. 5, a hybrid stator core component 250 includes both a laminated component and a molded soft magnetic composite component to enhance the performance of the stator core component, as well as ease of manufacturing. Thus, hybrid stator core component 250 includes a laminated insert 260 in a central region 252 and a molded soft magnetic composite material 270 disposed around the laminated insert 260 to define at least a portion of an exterior 254 of the hybrid stator core component 250.

Figure 5:
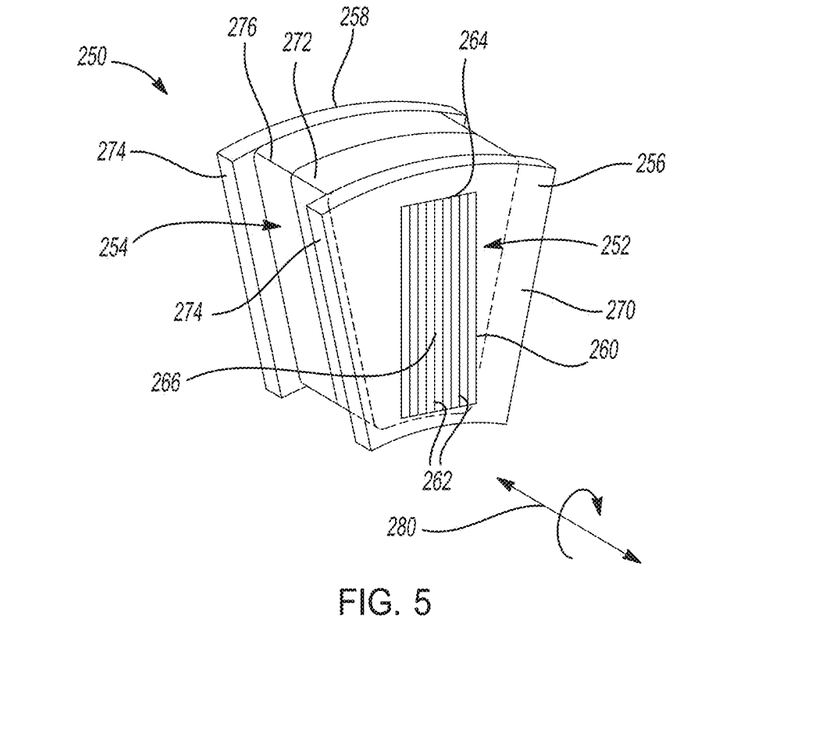
FIG. 5 shows a hybrid stator core component prepared in accordance with certain aspects of the present disclosure having a laminated insert and a molded soft magnetic composite.

The laminated insert 260 comprises a plurality of layers 262. The sheets forming layers 262 may comprise a ferromagnetic material and each may have at least one insulative layer or coating disposed therebetween. Suitable ferromagnetic materials for laminated stator core components are known in the art and include magnetic steel, by way of non-limiting example. The insulating materials interleaved between respective layers of the plurality of layers 262 may be non-magnetic materials. By way of non-limiting example, the insulating materials may include a siloxane-based material, like a silicone varnish, or a metal-organic or inorganic insulating material, for example a silicate layer, an oxide layer, a phosphate layer, and equivalents and combinations thereof.

As shown, each sheet or layer 262 forming the plurality of layers 262 has substantially the same footprint as the other layers 262, for example, having substantially the same dimensions, including the same width, length, and thickness while accounting for manufacturing deviations and tolerances. Thus, each layer of the plurality of insulated layers may be understood to have substantially the same dimensions. As referred to herein, the word "substantially," when applied to a characteristic of an element described, indicates that there may be a minor variation in the characteristic beyond what is exactly specified (for example, variation due to manufacturing tolerances) without having a substantial effect on the mechanical or physical attributes of the element. The laminated insert 260 having a plurality of layers 262 of the same dimensions may define a rectangular cross-sectional shape. In certain aspects, the laminated insert 260 having the rectangular cross-sectional shape may define a three-dimensional cube or cuboid. In this manner, manufacturing of the laminated insert 260 is streamlined where a plurality of layers 262 each have the same standard dimensions and shape. In certain aspects, each layer of plurality of layers 262 has a thickness ranging from greater than or equal to about 0.1 mm to less than or equal to about 0.5 mm. As will be appreciated by those of skill in the art, the size/dimensions of the plurality of layers 262 depends upon the size of the motor and size of the stator core and thus may vary. In certain variations, a total volume of the hybrid stator core component filled with laminated steel may range from greater than or equal to about 10 volume % to less than or equal to about 90 volume %.

An external perimeter 264 or circumferential region of the laminated insert 260 is at least partially surrounded by the molded soft magnetic composite material 270 component. Notably, the hybrid stator core component 250 defines a first side or external surface 256 and a second side or external surface 258. The three dimensional laminated insert 260 defines six sides. While a portion of external perimeter the laminated insert 260 is surrounded (i.e., surrounded on four of six sides) by the molded soft magnetic composite material 270, notably, two sides of the laminated insert 260 may be exposed on the first external surface 256 and on the second external surface 258 (not shown in the view of FIG. 5). Thus, the laminated insert 260 may define a first central region 266 of the first external surface 256 and a second central region (not shown) of the second external surface 258 of the hybrid stator core component 250.

The laminated insert 260 and the molded soft magnetic composite material 270 are integrally formed with one another. The molded soft magnetic composite material 270 is molded around the laminated insert 260. For example, after being manufactured, the laminated insert 260 may be disposed within a mold (e.g., as a molding insert) having a predetermined shape that will define the hybrid stator core component 250.

A precursor of the soft magnetic composite material may include for example, ferromagnetic powder particles and optional matrix materials, like polymeric resin. The precursor(s) may be introduced into the mold and fill the regions around the laminated insert 260 disposed therein. The precursor of the soft magnetic composite material may be densified, for example, by applying compressive force to the mold. In certain aspects, the applied pressure may be greater than or equal to about 1,000 MPa. Further, as necessary, additional heat and/or actinic radiation may be applied for reacting the matrix, for example, polymerizing or cross-linking. In certain variations, to enhance adhesion of the laminated insert to the molded soft magnetic composite material, an adhesive or glue may be further employed at the interface therebetween.

In certain aspects, the precursor of the molded soft magnetic composite material 270 includes particles defining a magnetic core surrounded by one or more insulation layers in a shell region. The magnetic material in the core may be ferromagnetic and comprise iron (e.g., iron or ferrite powder) or other magnetizable materials or alloys, including for example, iron alloys comprising silicon, nickel, and/or phosphorus, by way of example. Other examples include rare earth metal compounds, such as those comprising samarium (Sm), neodymium (Nd), like samarium cobalt (SmCo 1:5), samarium cobalt (SmCo 2:17), and neodymium iron boron (NdFeB). Other examples of suitable magnetic particles include aluminum nickel cobalt (AlNiCo) alloys. In certain aspects, an average particle diameter of the magnetic particles may be greater than or equal to about 50 micrometers to less than or equal to about 250 micrometers, and in certain aspects, optionally about 100 micrometers. The core region comprising the magnetic material may be surrounded by one or more insulation layers that is a non-magnetic material, such as a siloxane-based material, like a silicone varnish, or a metal-organic or inorganic insulating material, for example a silicate layer, an oxide layer, a phosphate layer, and equivalents and combinations thereof. In certain aspects, the insulating shell layer(s) may have a total thickness of greater than or equal to about 10 nm to less than or equal to about 1 mm and in certain aspects, optionally greater than or equal to about 10 nm to less than or equal to about 800 micrometers.

Further, as necessary, a binder layer can serve as a matrix to help adhere individual particles to one another. The binder or matrix may comprise thermoset or thermoplastic polymers, such as elastomers or polytetrafluoroethylene, or alternatively, a wax, by way of example.

Relatively high pressing pressures are used to press and consolidate the precursor SMC powders to form the molded soft magnetic composite material 270. While it is densified and compressed, it should be noted that the molded soft magnetic composite material 270 is not sintered.

In this manner, a molded soft magnetic composite material 270 may be integrally formed around the laminated insert 260, which is non-releasably seated within the molded soft magnetic composite material 270. Thus, together the laminated insert 260 and molded soft magnetic composite material 270 form a unitary single hybrid stator core component 250. It is advantageous to have the ability to mold the exterior portion 254 of the hybrid stator core component 250 to form a complex shape, for example, as shown in FIG. 5, a substantially trapezoidal cross-sectional shape. As shown, the hybrid stator core component 250 defines an external surface 272 with two flanges 274 that together define a recessed region 276. As noted above, the recessed region 276 is configured to receive wire conductors or windings (not shown). Further, as will be appreciated by those of skill in the art, the hybrid stator core component 250 is not limited to this design shown, but instead may have a variety of other shapes and configurations for receiving at least a portion of one or more wire windings or conductors. The hybrid stator cores thus formed provide advantages of manufacturing complex stator core component shapes, while advantageously improving performance by reducing eddy currents and hysteresis due to the presence of the integrated laminated core insert.

In FIG. 5, the hybrid stator core component 250 can be oriented with respect to a stator shaft (not shown) that defines an axis of rotation 280. As noted above, in an axial flux motor, the magnetic flux generated during operation is parallel with the axis of rotation 280. As shown in FIG. 5, the plurality of layers 262 in the laminated insert 260 each define a major plane (defined by width and length that define a major surface). The major planes of each of the plurality of layers 262 are parallel to one another. In the laminated insert 260 design, the major planes of the plurality of layers 262 are generally parallel to the axis of rotation 280.

Figure 6:
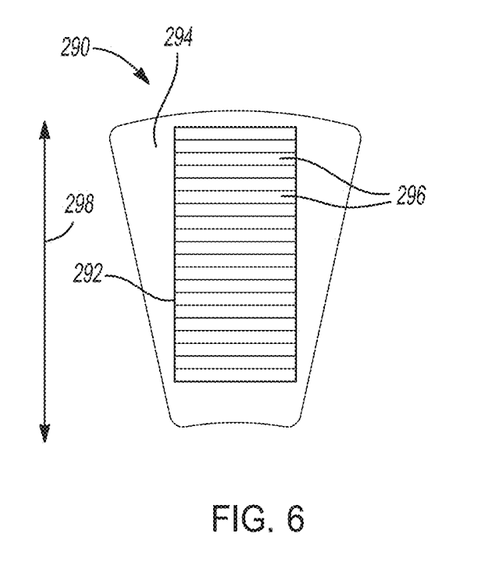
FIG. 6 shows another hybrid stator core component prepared in accordance with certain other aspects of the present disclosure having a laminated insert and a molded soft magnetic composite.

FIG. 6 shows another variation of a hybrid stator core component 290, similar to FIG. 5, but where the layers in the laminated insert have a different orientation with respect to the axis of rotation according to other aspects of the present disclosure. The hybrid stator core component 290 includes a laminated insert 292 and a molded soft magnetic composite material 294. The laminated insert 292 comprises a plurality of layers 296 that each define a major plane parallel to one another. The hybrid stator core component 290 defines an elongated dimension 298 (such as a length). In the laminated insert 292 design, the major planes of the plurality of layers 296 are generally perpendicular to the elongated dimension 298.

Figure 7:
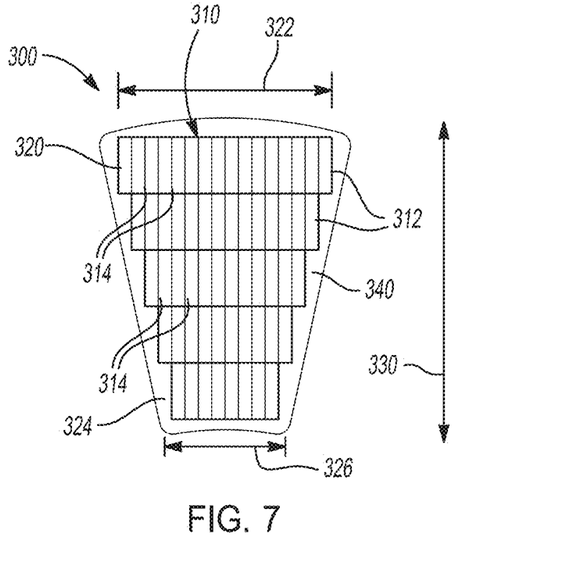
FIG. 7 shows a hybrid stator core component prepared in accordance with yet other aspects of the present disclosure having an insert assembly including a plurality of laminated inserts and a molded soft magnetic composite.

In yet other aspects, the present disclosure contemplates a hybrid stator core component having a central region comprising an assembly of a plurality of laminated inserts, which are integrally formed with a molded soft magnetic composite component. FIG. 7 shows such a hybrid stator core component 300. An insert assembly 310 comprises a plurality of distinct laminated inserts 312. Each laminated insert 312 itself comprises a plurality of distinct layers 314 of ferromagnetic material. Each sheet or layer 314 has substantially the same footprint/dimensions as the other layers 314 within its respective laminated insert 312. The plurality of layers 314 may have the same properties as described in the context of the plurality of layers 262 in the laminated insert 260 described in the context of FIG. 5 and for brevity will not be repeated herein. Each laminated insert 312 has a plurality of layers 314 of the same dimensions, which may define a rectangular cross-sectional shape. In certain aspects, each laminated insert 312 having the rectangular cross-sectional shape may define a three-dimensional cube or cuboid.

However, each insert 312 of the plurality of inserts 312 in the assembly 310 has different dimensions from the other inserts 312. For example, a first laminated insert 320 at the top of the hybrid stator core component 300 has a first width 322. A second laminated insert 324 at the bottom of the hybrid stator core component 300 has a second width 326. The first width 322 is greater than the second width 326. In the variation in FIG. 7, each of the plurality of inserts 312 has a different dimension from an adjacent insert 312. It should be noted that while not shown in FIG. 7, certain individual inserts of the plurality of inserts may have the same dimensions as other inserts, depending on the desired shape of the laminated insert in the central region of the hybrid stator core component. However, as shown, the hybrid stator core component 300 has five distinct laminated inserts 312 each of which has different dimensions. It should be noted that a laminated insert assembly is not necessarily limited to the number or orientation of inserts 312 as shown in FIG. 7. Notably, each respective plurality of distinct layers 314 of ferromagnetic material (in each respective insert of the plurality of inserts 312) share uniform dimensions and shape (e.g., each distinct layer 314 has the same footprint or dimensions as other layers), which streamlines manufacturing and reduces waste when forming the standard laminated inserts. Further, different thicknesses of laminations can be selected or hybrid combinations of different thicknesses, as well as oriented and non-oriented laminations.

As shown, the plurality of layers 314 in each laminated insert 312 defines parallel major planes to one another. The hybrid stator core component 300 defines an elongated dimension 330 (such as a length). For each laminated insert 312 in the assembly 310, the major planes of the plurality of layers 314 are parallel to the elongated dimension 330.

A molded soft magnetic composite material 340 is molded around the insert assembly 310 comprising the plurality of distinct laminated inserts 312. The molded soft magnetic composite material 340 defines an exterior region of the hybrid stator core component 300. For example, after being manufactured, the insert assembly 310 may be disposed within a mold (e.g., as a molding insert) having a predetermined shape that will define the hybrid stator core component 300 around which the molded soft magnetic composite material 340 is compressed and molded. Thus, the molded soft magnetic composite material 340 fills in voids around the insert assembly 310 and after molding surrounds and is in contact with various surfaces of the insert assembly 310, so that the insert assembly 310 and the molded soft magnetic composite material 340 are integrally formed with one another. In the embodiment shown in FIG. 7, the hybrid stator core component 300 thus has a significant portion of its overall volume filled with laminated inserts, which serves to help enhance performance by further reducing hysteresis.

Figure 8:
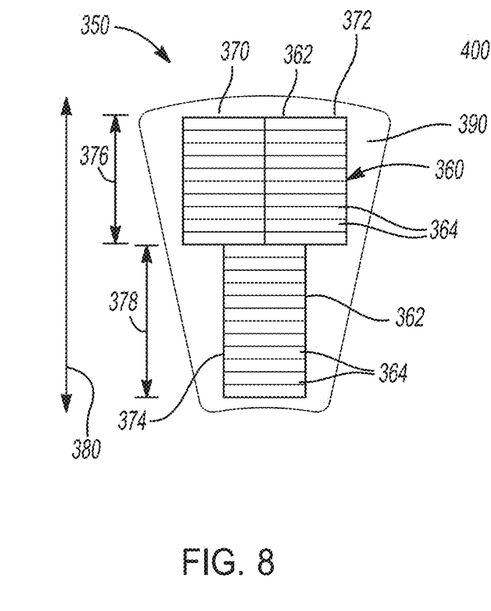
FIG. 8 shows another hybrid stator core component prepared in accordance with certain other aspects of the present disclosure having an insert assembly including a plurality of laminated inserts and a molded soft magnetic composite.

FIG. 8 shows yet another hybrid stator core component 350. An insert assembly 360 comprises a plurality of distinct laminated inserts 362. Each laminated insert 362 itself comprises a plurality of distinct layers 364 of ferromagnetic material. Each sheet or layer 364 has substantially the same footprint/dimensions as the other layers 364 within its respective laminated insert 362. The plurality of layers 364 may have the same properties as described in the context of the plurality of layers 262 in the laminated insert 260 described in the context of FIG. 5 and for brevity will not be repeated herein. Each laminated insert 362 has a plurality of layers 364 with the same dimensions, which may define a rectangular cross-sectional shape. In certain aspects, each laminated insert 362 having the rectangular cross-sectional shape may define a three-dimensional cube or cuboid.

However, select inserts of the plurality of inserts 362 in the assembly 360 may have different dimensions from the other inserts 362. In FIG. 8, the assembly 360 includes three laminated inserts 362, namely a first laminated insert 370, a second laminated insert 372, and a third laminated insert 374. The first laminated insert 370 and the second laminated insert 372 have the same dimensions, including width, length, and height. However, the third laminated insert 374 may deviate from the dimensions of the first and second laminated inserts 370, 372, for example, having a distinct and longer length. For example, the first laminated insert 370 and second laminated insert 372 may have a first length 376 and the third laminated insert 374 may have a second length 378 that is greater than the first length 376. While three inserts 362 are shown in assembly 360, as with the other embodiment shown in FIG. 7 having a laminated insert assembly, such an assembly is not necessarily limited to the number or orientation of inserts 362 shown. Again, each of the respective plurality of insulated layers 364 of ferromagnetic material has uniform dimensions and shape in a given laminated insert 362. This uniformity streamlines manufacturing and reduces waste when forming the standard laminated inserts.

As shown, the plurality of layers 364 in each laminated insert 362 defines major planes that are parallel to one another. The hybrid stator core component 350 defines an elongated dimension 380 (such as a length). For each laminated insert 362 in the insert assembly 360, the major planes of the plurality of layers 364 are perpendicular to the elongated dimension 380.

A molded soft magnetic composite material 390 is molded around the insert assembly 360 that comprises the plurality of distinct laminated inserts 362. The molded soft magnetic composite material 390 defines an exterior region of the hybrid stator core component 350. For example, after being manufactured, the insert assembly 360 may be disposed within a mold (e.g., as a molding insert) having a predetermined shape that will define the hybrid stator core component 350 around which the molded soft magnetic composite material 390 is compressed and molded. The molded soft magnetic composite material 390 fills in voids around the insert assembly 360. After the molding process, the molded soft magnetic composite 390 surrounds and is in contact with various surfaces of the insert assembly 360, so that the insert assembly 360 and the molded soft magnetic composite material 390 are integrally formed with one another. As described in the context of FIG. 5, while four sides of the insert assembly 360 may be surrounded by the molded soft magnetic composite 390, two sides of the insert assembly 360 may form a portion of an exposed or external surface of the hybrid stator core component 350. In the embodiment shown in FIG. 8, the hybrid stator core component 350 thus has a significant portion of its overall volume filled with laminated inserts, which serves to help enhance performance by further reducing hysteresis.

Figure 9:
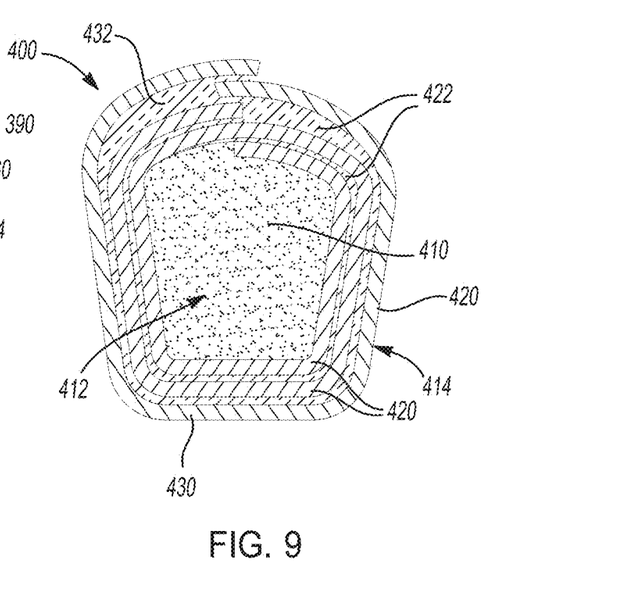
FIG. 9 shows a hybrid stator core component prepared in accordance with yet other aspects of the present disclosure having a molded soft magnetic composite core and a laminated shell including a plurality of layers including a ferromagnetic material disposed around the core.

FIG. 9 shows yet another variation of a hybrid stator core component 400 for an axial flux motor stator prepared in accordance with the present disclosure. Notably, the size of gaps shown are for illustration purposes and are not proportional to actual sizes or dimensions. The hybrid stator core component 400 has a molded soft magnetic composite core 410 in a central region 412. A shell region 414 comprises a plurality of layers 420 of a ferromagnetic material, such as those described previously above in the context of the plurality of ferromagnetic material layers in the laminated insert. As described above, in certain aspects, the plurality of layers 420 may be insulated with an insulating material 422 like the non-magnetic insulating materials described previously above disposed between respective layers of the plurality of layers 420. As shown, the ferromagnetic material may be a single sheet that is rolled or wrapped multiple times around the molded soft magnetic composite core 410 and thus may be considered to define a plurality of layers in a radially outward direction from the central region 412 (although the ferromagnetic material forming the plurality of layers 420 may be the same single sheet). The molded soft magnetic composite core 410 may be shaped in any number of predetermined shapes that are conducive to subsequently rolling or wrapping the plurality of layers 420 around the shell region 414 corresponding to the exterior of the hybrid stator core component 400. The laminated shell comprising the plurality of layers of ferromagnetic material may thus define an external surface of the hybrid stator core component 400, which may further define other features, such as at least one recessed region configured to receive conductive wire windings.

An exemplar of a conductive wire winding 430 is shown wrapped around the exterior shell region 414 of the hybrid stator core component 400. As shown in FIG. 9, one or more layer(s) of insulating material 432 may be disposed between the plurality of laminated layers 420 and the conductive wire winding 430. Again, the insulating material 432 may be any of the examples described previously above. The hybrid stator core component 400 thus provides an integrally formed molded soft magnetic composite material core region with a plurality of insulated layers of ferromagnetic material forming a shell region, providing a combination of such materials that serves to enhance performance by reducing eddy currents and/or hysteresis.

The present disclosure thus provides a hybrid stator core component for an axial flux motor stator that comprises a molded soft magnetic composite material and a laminated component that are integrally formed with one another. In one variation, the laminated component is a laminated insert comprising a plurality of insulated layers comprising a ferromagnetic material. The molded soft magnetic composite material is disposed around a portion of a perimeter of the laminated insert, wherein the laminated insert is non-releasably seated within the molded soft magnetic composite. In other variations, the hybrid stator core component has a molded soft magnetic composite and a laminated shell comprising a plurality of layers comprising a ferromagnetic material disposed around at least a portion of the molded soft magnetic composite core.

In certain variations, the present disclosure contemplates an axial flux motor that includes a stator comprising a plurality of hybrid stator core components, such as any of those described above in the context of FIGS. 5-9. Each hybrid stator core component has conductive wire disposed around an exterior thereof. The axial flux motor also comprises a rotor facing the stator. The rotor may comprise a plurality of magnets. Further, the stator and the rotor define an air gap therebetween. There is also a rotor shaft coupled to the rotor and defining a rotational axis. In certain variations, a plurality of insulated layers in each hybrid stator core component may define a major plane. Further, the hybrid stator cores may define an elongated dimension. Each of the plurality of insulated layers defines a major plane that are parallel to one another. In certain aspects, each major plane can be parallel to the elongated dimension or perpendicular to the elongated dimension. In other variations, the major planes defined by the layers may not necessarily be parallel or perpendicular to the elongated dimension drawn, but rather may be an angle other than 0° or 90°. Thus, although the major planes can be horizontal, vertical, or slanted when viewed from a front or back of the core body, in certain aspects, the major planes of the layers are parallel to an axis of rotation. A parallel orientation may be advantageous in that the magnetic flux in general does not cross the insulation layers between magnetic layers (e.g., of silicon steel), because they are ideally parallel to the major planes as well.

In other aspects, the present disclosure provides methods of making a hybrid stator core component for an axial flux motor stator. The applied pressure may be greater than or equal to about 1,000 MPa. The method may comprise disposing a laminated insert having a plurality of insulated layers comprising a ferromagnetic material in a mold. The mold may have a predetermined shape corresponding to the hybrid stator core component. A precursor of a soft magnetic composite material may then be introduced to the mold. The precursor may be like that described previously above and may comprise a plurality of magnetic particles each having an insulating coating. Pressure may be applied (with optional heat) to mold the precursor into a soft magnetic composite material that surrounds a portion of a perimeter of the laminated insert. In certain aspects, where a binder or matrix is present between particles, the precursor may be exposed to actinic radiation or otherwise may cause the binder to react or cross-link. Further, in certain aspects, the laminated insert can be affixed to the molded SMC with adhesives or glue or other methods, for example, by applying an adhesive prior to introducing the precursor of the soft magnetic composite material into the mold. In this manner, the laminated insert is non-releasably seated within the molded soft magnetic composite. As noted above, in certain variations, the laminated insert is a plurality of laminated inserts that form an insert assembly.

In yet other aspects, the methods may comprise forming the laminated insert prior to the disposing. The laminated insert may be made by punching or cutting each layer from a sheet of ferromagnetic material and stacking the layers together. As noted above, the sheet of ferromagnetic material may have a coating of insulating material that is disposed on at least one surface prior to the punching or cutting, or the insulating material may be applied after the punching or cutting or interleaved as a separate material during the stacking process.

In yet other aspects, the present disclosure provides methods of making a hybrid stator core component for an axial flux motor stator. The method may comprise forming a core region of a molded soft magnetic composite material. A precursor of a soft magnetic composite material may be introduced to a mold that may have a predetermined shape corresponding to the desired shape of the core region. As described previously, the precursor may comprise a plurality of magnetic particles each having an insulating coating. Pressure may be applied (with optional heat) to mold the precursor into a soft magnetic composite material that will define a core region of the hybrid stator core component. In certain aspects, where a binder or matrix is present between particles, the precursor may be exposed to actinic radiation or otherwise may cause the binder to react or cross-link. The core comprising the molded soft magnetic composite material may be removed from the mold.

Next, at least one sheet of ferromagnetic material is rolled or wound about an exterior of the molded soft magnetic composite material core. In this manner, the sheet(s) of ferromagnetic material form a plurality of layers. As noted above, the sheet may have an insulating coating applied prior to the assembly process or it may be stacked with an insulating layer(s), so that as it is rolled over the core region, insulated layers are formed between layers of a ferromagnetic material. In this manner, an integrally formed hybrid stator core component is formed having both a core region comprising the molded soft magnetic composite material and a laminated shell comprising the insulated layers of ferromagnetic material.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A hybrid stator core component defining a magnetizable pole of a stator for an axial flux motor, the hybrid stator core component comprising:
    a bottom defining an inner circumferential surface and a top defining an outer circumferential surface;
    a first side defining a first recessed region and an opposite second side defining a second recessed region, the first side and the second side each extending in a radial direction between the bottom and the top;
    a laminated insert disposed in a central region between the bottom and the top and between the first side and the second side, the laminated insert comprising a plurality of insulated layers comprising a ferromagnetic material; and
    a molded soft magnetic composite material disposed around at least a portion of a perimeter of the laminated insert, wherein the laminated insert is non-releasably seated within the molded soft magnetic composite,
    wherein the first recessed region and the second recessed region are configured to receive a conductive wire winding that wraps around at least a portion of the perimeter of the laminated insert, and
    wherein the first recessed region and the second recessed region are defined by the molded soft magnetic composite material.

2. The hybrid stator core component of claim 1, wherein each layer of the plurality of layers has substantially the same dimensions.

3. The hybrid stator core component of claim 1, wherein the laminated insert has a rectangular cross-sectional shape.

4. The hybrid stator core component of claim 1, further comprising:
    a front defining a first external surface and a back defining an opposite second external surface,
    wherein both the first external surface and the second external surface extend in a radial direction between the bottom and the top and in a circumferential direction between the first side and the second side, and
    wherein the laminated insert defines a first region of the first external surface and/or a second region of the second external surface.

5. The hybrid stator core component of claim 1, further comprising a plurality of laminated inserts that define an insert assembly, wherein the molded soft magnetic composite material is disposed around a portion of each of the plurality of laminated inserts in the insert assembly.

6. The hybrid stator core component of claim 5, wherein the insert assembly comprises at least three laminated inserts.

7. The hybrid stator core component of claim 5, wherein the insert assembly comprises at least five laminated inserts.

8. The hybrid stator core component of claim 1, wherein the molded soft magnetic composite material defines an external cross-sectional shape that is substantially trapezoidal.

9. The hybrid stator core component of claim 1, wherein the ferromagnetic material comprises a steel and the soft magnetic composite material comprises a plurality of magnetic particles comprising iron.

10. An axial flux motor comprising:
    a stator comprising a plurality of hybrid stator core components of claim 1, wherein the plurality of hybrid stator core components are positioned adjacent one another along a circumference of the stator such that a channel is defined and extends in a radial direction between each adjacent pair of hybrid stator core components;
    a rotor facing the stator and comprising a plurality of magnets, wherein the stator and the rotor define an air gap therebetween; and
    a rotor shaft coupled to the rotor and defining a rotational axis, wherein the plurality of insulated layers each defines a major plane that are parallel to one another,
    wherein a conductive wire winding is wrapped around an exterior of each of the plurality of hybrid stator core components.

11. The hybrid stator core component of claim 1, wherein the molded soft magnetic composite material is not sintered.

12. The hybrid stator core component of claim 1, wherein the molded soft magnetic composite material extends continuously around the perimeter of the laminated insert, and wherein the inner circumferential surface and the outer circumferential surface are defined by the molded soft magnetic composite material.

13. A hybrid stator core component defining a magnetizable pole of a stator for an axial flux motor, the hybrid stator core component comprising:
    a bottom defining an inner circumferential surface and a top defining an outer circumferential surface;
    a first side and an opposite second side, the first side and the second side each extending in a radial direction between the bottom and the top;
    a molded soft magnetic composite core disposed in a central region between the bottom and the top and between the first side and the second side; and
    a laminated shell comprising a plurality of layers comprising a ferromagnetic material, the laminated shell disposed around at least a portion of the molded soft magnetic composite core,
    wherein the laminated shell defines at least a portion of the inner circumferential surface, the outer circumferential surface, the first side, and the opposite second side.

14. The hybrid stator core component of claim 13, wherein an insulating material is disposed adjacent to at least one of the plurality of layers.

15. The hybrid stator core component of claim 13, wherein the first side defines a first recessed region and the second side defines a second recessed region, and wherein the first recessed region and the second recessed region are configured to receive a conductive wire winding that wraps around at least a portion of the exterior of the hybrid stator core component.

16. The hybrid stator core component of claim 13, wherein the ferromagnetic material comprises a steel and the soft magnetic composite material comprises a plurality of magnetic particles comprising iron.

17. An axial flux motor comprising:
- a stator comprising a plurality of hybrid stator core components of claim 13, wherein the plurality of hybrid stator core components are positioned adjacent one another along a circumference of the stator such that a channel is defined and extends in a radial direction between each adjacent pair of hybrid stator core components;
- a rotor facing the stator and comprising a plurality of magnets, wherein the stator and the rotor define an air gap therebetween; and
- at least one rotor shaft coupled to the rotor and defining a rotational axis,
- wherein a conductive wire winding is wrapped around the exterior of each of the plurality of hybrid stator core components.

18. A method of making a hybrid stator core component for an axial flux motor stator, the method comprising:
- disposing a laminated insert comprising a plurality of insulated layers comprising a ferromagnetic material in a mold having a predetermined shape corresponding to the hybrid stator core component, wherein the predetermined shape of the hybrid stator core component includes a bottom defining an inner circumferential surface, a top defining an outer circumferential surface, a first side defining a first recessed region, and an opposite second side defining a second recessed region, the first side and the second side each extending between the bottom and the top; and
- introducing a precursor of a soft magnetic composite material comprising a plurality of magnetic particles each having an insulating coating and applying pressure to mold a soft magnetic composite material around a portion of a perimeter of the laminated insert, wherein the laminated insert is non-releasably seated within the molded soft magnetic composite material such that the laminated insert is disposed in a central region of the hybrid stator core component between the bottom and the top and between the first side and the second side,
- wherein the first recessed region and the second recessed region are configured to receive a conductive wire winding that wraps around at least a portion of the perimeter of the laminated insert, and
- wherein the first recessed region and the second recessed region are defined by the molded soft magnetic composite material.

19. The method of claim 18, wherein the laminated insert is a plurality of laminated inserts that form an insert assembly.

20. The method of claim 18, further comprising forming the laminated insert prior to the disposing by punching each layer from a sheet of ferromagnetic material and stacking the layers together.

* * * * *